United States Patent
Ji et al.

(10) Patent No.: US 10,077,821 B2
(45) Date of Patent: Sep. 18, 2018

(54) PLANETARY GEAR TRAIN OF AUTOMATIC TRANSMISSION FOR VEHICLES

(71) Applicant: Hyundai Motor Company, Seoul (KR)

(72) Inventors: Seongwook Ji, Ansan-si (KR); Seong Wook Hwang, Gunpo-si (KR); Woochurl Son, Seongnam-si (KR); Wonmin Cho, Hwaseong-si (KR); Hyun Sik Kwon, Seoul (KR); Jae Chang Kook, Hwaseong-si (KR)

(73) Assignee: Hyundai Motor Company, Seoul (KR)

(*) Notice: Subject to any disclaimer, the term of this patent is extended or adjusted under 35 U.S.C. 154(b) by 289 days.

(21) Appl. No.: 15/178,442

(22) Filed: Jun. 9, 2016

(65) Prior Publication Data

US 2017/0159757 A1    Jun. 8, 2017

(30) Foreign Application Priority Data

Dec. 2, 2015   (KR) .......................... 10-2015-0170984

(51) Int. Cl.
*F16H 3/66*    (2006.01)
(52) U.S. Cl.
CPC ......... *F16H 3/66* (2013.01); *F16H 2200/006* (2013.01); *F16H 2200/201* (2013.01); *F16H 2200/2046* (2013.01)
(58) Field of Classification Search
None
See application file for complete search history.

(56) References Cited

U.S. PATENT DOCUMENTS

| 3,987,690 | A | * | 10/1976 | Murakami | F16H 3/666 475/276 |
|---|---|---|---|---|---|
| 7,988,588 | B2 | | 8/2011 | Phillips et al. | |
| 2003/0162625 | A1 | * | 8/2003 | Raghavan | F16H 3/66 475/280 |
| 2003/0232684 | A1 | * | 12/2003 | Raghavan | F16H 3/66 475/269 |
| 2004/0242366 | A1 | * | 12/2004 | Tabata | F16H 3/663 475/275 |
| 2011/0028261 | A1 | | 2/2011 | Yamamoto et al. | |

FOREIGN PATENT DOCUMENTS

JP    5039107 B2    10/2012
JP    5904762 B2    4/2016

* cited by examiner

*Primary Examiner* — Colby M Hansen
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set including first, second, and third rotational elements, a second planetary gear set including fourth, fifth, and sixth rotational elements, a third planetary gear set including seventh, eighth, and ninth rotational elements, a first rotation shaft, a second rotation shaft directly connected to the input shaft, a third rotation shaft, a fourth rotation shaft selectively connected to a transmission housing, a fifth rotation shaft directly connected to the output shaft, a sixth rotation shaft directly connected to the input shaft, a seventh rotation selectively connected to the first rotation shaft and the third rotation shaft, and an eighth rotation shaft selectively connected to the fourth rotation shaft and the fifth rotation shaft.

10 Claims, 2 Drawing Sheets

FIG. 2

|  | C1 | C2 | C3 | C4 | B1 | B2 | Gear ratio |
|---|---|---|---|---|---|---|---|
| D1 |  | ● |  | ● | ● |  | 4.167 |
| D2 |  | ● | ● |  | ● |  | 2.667 |
| D3 | ● | ● |  |  | ● |  | 1.667 |
| D4 | ● |  | ● |  | ● |  | 1.303 |
| D5 | ● |  | ● | ● |  |  | 1.000 |
| D6 | ● |  |  | ● | ● |  | 0.758 |
| D7 | ● |  |  | ● |  | ● | 0.652 |
| D8 | ● |  |  |  | ● | ● | 0.556 |
| REV |  | ● |  | ● |  | ● | -3.750 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0170984 filed Dec. 2, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that can improve power delivery performance and reduce fuel consumption by achieving eight forward speed stages using a minimum number of constituent elements.

Description of Related Art

The recent increase in oil prices has caused car makers to meet global demands for improving fuel efficiency. Accordingly, research is being conducted on engines in terms of reducing weight and improving fuel efficiency by downsizing, and research is also being conducted to ensure both drivability and competitiveness for maximizing fuel efficiency by implementing an automatic transmission with multiple speed stages.

However, in the case of the automatic transmission, the number of internal components is increased as the number of gear shift stages is increased, and as a result, the automatic transmission may be difficult to mount, the manufacturing cost and weight may be increased, and power transmission efficiency may be deteriorated.

Accordingly, development of a planetary gear train which may bring about maximum efficiency with a small number of components is important in order to increase a fuel efficiency enhancement effect through the multiple speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel efficiency by achieving eight forward speed stages and one reverse speed stage using a driving point positioned at a low engine speed.

According to various aspects of the present invention, a planetary gear train of an automatic transmission for a vehicle may include an input shaft receiving torque of an engine, an output shaft outputting changed torque of the engine, a first planetary gear set including first, second, and third rotational elements, a second planetary gear set including fourth, fifth, and sixth rotational elements, a third planetary gear set including seventh, eighth, and ninth rotational elements, a first rotation shaft including the first rotational element and the sixth rotational element, a second rotation shaft including the second rotational element and directly connected to the input shaft, a third rotation shaft including the third rotational element, a fourth rotation shaft including the fourth rotational element and selectively connected to a transmission housing, a fifth rotation shaft including the fifth rotational element and directly connected to the output shaft, a sixth rotation shaft including the seventh rotational element and directly connected to the input shaft, a seventh rotation shaft including the eighth rotational element and selectively connected to the first rotation shaft and the third rotation shaft, and an eighth rotation shaft including the ninth rotational element and selectively connected to the fourth rotation shaft and the fifth rotation shaft.

The first planetary gear set may be a single-pinion planetary gear set, in which the first rotation element is a first sun gear, the second rotation element is a first planet carrier, and the third rotation element is a first ring gear, the second planetary gear set may be a single-pinion planetary gear set, in which the fourth rotation element is a second sun gear, the fifth rotation element is a second planet carrier, and the sixth rotation element is a second ring gear, and the third planetary gear set may be a single-pinion planetary gear set, in which the seventh rotation element is a third sun gear, the eighth rotation element is a third planet carrier, and the ninth rotation element is a third ring gear.

The planetary gear train may further include a first clutch that selectively connecting the third and seventh rotation shafts, a second clutch selectively connecting the first rotation shaft and the seventh rotation shaft, a third clutch selectively connecting the fifth rotation shaft and the eighth rotation shaft, a fourth clutch selectively connecting the fourth rotation shaft and the eighth rotation shaft, a first brake selectively connecting the fourth rotation shaft and the transmission housing, and a second brake selectively connecting the seventh rotation shaft and the transmission housing.

A first forward speed stage may be achieved by operation of the second and fourth clutches and the first brake, a second forward speed stage may be achieved by operation of the second and third clutches and the first brake, a third forward speed stage may be achieved by operation of the first and second clutches and a first brake, a fourth forward speed stage may be achieved by operation of the first and third clutches and the first brake, a fifth forward speed stage may be achieved by operation of the first, third, and fourth clutches, a sixth forward speed stage may be achieved by operation of the first and fourth clutches and the first brake, a seventh forward speed stage may be achieved by operation of the first and fourth clutches and the second brake, an eighth forward speed stage may be achieved by operation of the first clutch and the first and second brakes, and shifting to the reverse speed stage may be achieved by operation of the second and fourth clutches and the second brake.

According to various aspects of the present invention, a planetary gear train of an automatic transmission for a vehicle may include an input shaft receiving torque of an engine, an output shaft outputting changed torque of the engine, a first planetary gear set including first, second, and third rotational elements, a second planetary gear set including fourth, fifth, and sixth rotational elements, a third planetary gear set including seventh, eighth, and ninth rotational elements, a first rotation shaft including the first rotational element and sixth rotational element, a second rotation shaft including the second rotational element and directly connected to the input shaft, a third rotation shaft including the third rotational element, a fourth rotation shaft including the fourth rotational element and selectively connected to a transmission housing, a fifth rotation shaft including the fifth rotational element and directly connected to the output shaft, a sixth rotation shaft including the seventh rotational element and directly connected to the input shaft, a seventh rotation shaft including the eighth rotational element and selectively connected to the first rotation shaft and the third rotation shaft, an eighth rotation shaft including the ninth rotational element and selectively connected to the fourth rotation shaft and the fifth rotation shaft, a first clutch selectively connecting the third and seventh rotation shafts, a second clutch selectively connecting the first rotation shaft and the seventh rotation shaft, a third clutch selectively connecting the fifth rotation shaft and the eighth rotation shaft, a fourth clutch selectively connecting the fourth rotation shaft and the eighth rotation shaft, a first brake selectively connecting the fourth rotation shaft and the transmission housing, and a second brake selectively connecting the seventh rotation shaft and the transmission housing.

According to various aspects of the present invention, a planetary gear train of an automatic transmission for a vehicle may include an input shaft receiving torque of an engine, an output shaft outputting changed torque of the engine, a first planetary gear set that is a single-pinion planetary gear set and includes a first sun gear, a first planet carrier, and a first ring gear, a second planetary gear set that is a single-pinion planetary gear set and includes a second sun gear, a second planet carrier, and a second ring gear, a third planetary gear set that is a single-pinion planetary gear set, and includes a third sun gear, a third planet carrier, and a third ring gear, a first rotation shaft including the first sun gear, a second rotation shaft including the first planet carrier and directly connected to the input shaft, a third rotation shaft including the first ring gear, a fourth rotation shaft including the second sun gear and selectively connected to a transmission housing, a fifth rotation shaft including the second planet carrier and directly connected to the output shaft, a sixth rotation shaft including the third sun gear and directly connected to the input shaft, a seventh rotation shaft including the third planet carrier and selectively connected to the first rotation shaft and the third rotation shaft, and an eighth rotation shaft including the third ring gear and selectively connected to the fourth rotation shaft and the fifth rotation shaft.

Various embodiments of the present invention may achieve eight forward speed stages and one reverse speed stage by combining three planetary gear sets with six friction elements. Therefore, power delivery performance and fuel efficiency may be improved.

Since a speed stage suitable for an engine speed can be achieved due to multiple speed stages, silent driving may be improved.

Since engine driving efficiency can be achieved due to multiple speed stages, power delivery performance and fuel efficiency may be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table representing operations at respective gear shift stages implemented by respective control elements applied to the exemplary planetary gear train according to the present invention.

Figure 1:
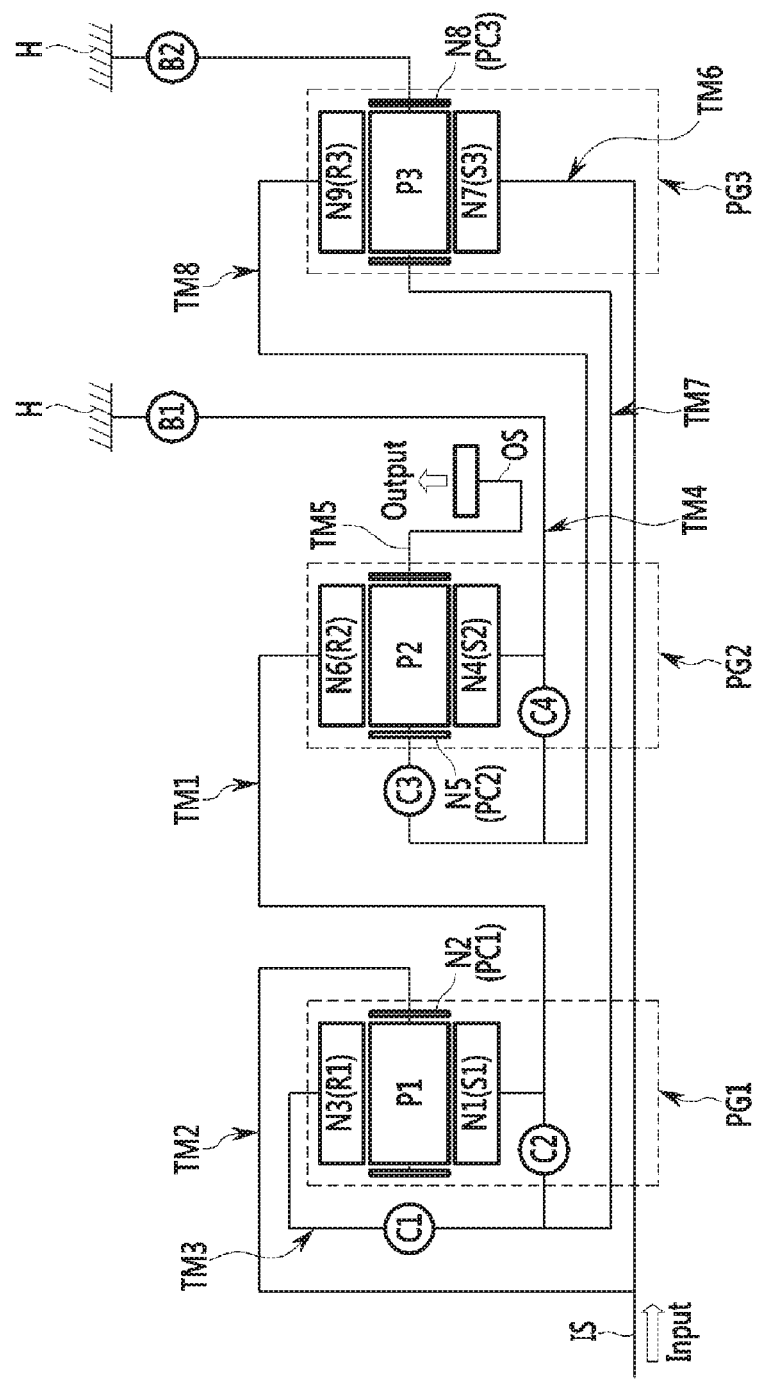
FIG. 1 is a configuration diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the inventions) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, a planetary gear train according to various embodiments of the present invention includes first, second, and third planetary gear sets PG1, PG2, and PG3 disposed on the same axis, an input shaft IS, an output shaft OS, eight rotation shafts TM1 to TM8 including at least one of rotation elements of the first, second, and third planetary gear sets PG1, PG2, and PG3, six friction elements C1 to C4, B1, and B2, and a transmission housing H.

As a result, torque input from the input shaft IS is changed by cooperation of the first, second, and third planetary gear sets PG1, PG2, and PG3, and the changed torque is output through the output shaft OS.

The planetary gear sets PG1, PG2, and PG3 are disposed sequentially from an engine side.

The input shaft IS is an input member, and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 as a single-pinion planetary gear set includes a first sun gear S1 which is a first rotation element N1, a first planetary carrier PC1 which is a second rotation element N2 that supports a first pinion P1 which outer-engages with the first sun gear S1 which is the first rotation element N1, and a first ring gear R1 which is a third rotation element N3 which inner-engages with the first pinion P1 as rotation elements.

The second planetary gear set PG2 as a single-pinion planetary gear set includes a second sun gear S2 which is a fourth rotation element N4, a second planet carrier PC2 which is a fifth rotation element N5 that supports a second pinion P2 which outer-engages with the second sun gear S2 which is the fourth rotation element N4, and a second ring gear R2 which is a sixth rotation element N6 which inner-engages with the second pinion P2 as rotation elements.

The third planetary gear set PG3 as a single-pinion planetary gear set includes a third sun gear S3 which is a seventh rotation element N7, a third planet earlier PC3 which is an eighth rotation element N8 that supports a third pinion P3 which outer-engages with the third sun gear S3 which is the seventh rotation element N7, and a third ring gear R3 which is a ninth rotation element N9 which inner-engages with the third pinion P3 as the rotation elements.

In the first, second, and third planetary gear set PG1, PG2, and PG3, the first rotational element N1 is directly connected to the sixth rotational element N5 so as to be operated with a total of eight rotation shafts TM1 to TM8.

Configurations of the eight rotation shafts TM1 to TM8 will be described below.

The first rotation shaft TM1 includes the first rotational element N1 (the first sun gear S1) and the sixth rotational element N6 (the second ring gear R2).

The second rotation shaft TM2 includes the second rotational element N2 (the first planet carriers PC1) and is directly connected to the input shaft IS.

The third rotation shaft TM3 includes the third rotational element N3 (the first ring gear R1).

The fourth rotation shaft TM4 includes the fourth rotational element N4 (the second sun gear S2) and is selectively connected to the transmission housing H.

The fifth rotation shaft TM5 includes the fifth rotational element N5 (the second planet carrier PC2), and is directly connected to the output shaft.

The sixth rotation shaft TM6 includes the seventh rotational element N7 (the third sun gear S3) and is directly connected to the input shaft IS.

The seventh rotation shaft TM7 includes the eighth rotational element N8 (the third planet carrier PC3) and is selectively connected to the first rotation shaft TM1 and the third rotation shaft TM3, and is selectively connected to the transmission housing H.

The eighth rotation shaft TM8 includes the ninth rotational element N9 (the third ring gear R3), and is selectively connected to the fourth rotation shaft TM4 and fifth rotation shaft TM5.

In addition, among the rotation shafts TM1 to TM8, four clutches C1, C2, C3, and C4 which are friction elements are disposed at connection portions where the rotation shafts are connected to each other.

Further, among the rotation shafts TM1 to TM8, two brakes B1 and B2 which are friction elements are disposed at connection portions between any one rotation shaft and the transmission housing H.

The six friction elements C1 to C4, B1, and B2 will now be described in further detail.

The first clutch C1 is interposed between the third rotation shaft TM3 and the seventh rotation shaft TM7 and selectively connects the third rotation shaft TM3 and the seventh rotation shaft TM7.

The second clutch C2 is interposed between the first rotation shaft TM1 and the seventh rotation shaft TM7 and selectively connects the first rotation shaft TM1 and the seventh rotation shaft TM7.

The third clutch C3 is interposed between the fifth rotation shaft TM5 and the eighth rotation shaft TM8 and selectively connects the fifth rotation shaft TM5 and the eighth rotation shaft TM8.

The fourth clutch C4 is interposed between the fourth rotation shaft TM4 and the eighth rotation shaft TM8 and selectively connects the fourth rotation shaft TM4 and the eighth rotation shaft TM8.

The first brake B1 is interposed between the fourth rotation shaft TM4 and the transmission housing H and selectively connects the fourth rotation shaft TM4 and the transmission housing H.

The second brake B2 is interposed between the seventh rotation shaft TM7 and the transmission housing H and selectively connects the seventh rotation shaft TM7 and the transmission housing H.

The friction elements including the first, second, third, and fourth clutches C1, C2, C3, and C4 and the first and second brakes B1 and B2 may be multi-plates friction elements of a wet type that are operated by hydraulic pressure.

FIG. 2 is a table representing operations at respective gear shift stages implemented by respective control elements applied to the planetary gear train according to various embodiments of the present invention.

As shown in FIG. 2, three friction elements are operated at each speed stage in the planetary gear train according to various embodiments of the present invention.

The second and fourth clutches C2 and C4 and the first brake B1 are simultaneously operated at a first forward speed stage D1. In a state that the first rotation shaft TM1 is connected to the seventh rotation shaft TM7 by operation of the second clutch C2, and the forth rotation shaft TM4 is connected to the eighth rotation shaft TM8 by operation of the fourth clutch C4, the input is made into the second and sixth rotation shafts TM2 and TM6. The fourth rotation shaft TM4 is operated as the fixed elements by operation of the first brake B1, and the first forward speed stage is achieved.

The second and third clutches C2 and C3 and the first brake Bi are simultaneously operated at the second forward speed stage D2. In a state that the first rotation shaft TM1 is connected to the seventh rotation shaft TM7 by operation of the second clutch C2, and the fifth rotation shaft TM5 is connected to the eighth rotation shaft TM8 by operation of the third clutch C3, the input is made into the second and sixth rotation shafts TM2 and TM6. The fourth rotation shaft TM4 is operated as the fixed elements by operation of the first brake B1, and the second forward speed stage is achieved.

The first and second clutches C1 and C2 and the first brake B1 are simultaneously operated at a third forward speed stage D3. In a state that the third rotation shaft TM3 is connected to the seventh rotation shaft TM7 by operation of the first clutch C1, and the first rotation shaft TM1 is connected to the seventh rotation shaft TM7 by operation of the second clutch C2, the input is made into the second and sixth rotation shafts TM2 and TM6. The fourth rotation shaft TM4 is operated as the fixed element by operation of the first brake B1, and the third forward speed stage is achieved.

The first and third clutches C1 and C3 and the first brake B1 are simultaneously operated at a fourth forward speed stage D4. In a state that the third rotation shaft TM3 is connected to the seventh rotation shaft TM7 by operation of the first clutch C1, and the fifth rotation shaft TM5 is connected to the eighth rotation shaft TM8 by operation of the third clutch C3, the input is made into the second and sixth rotation shafts TM2 and TM6. The fourth rotation shaft TM4 is operated as the fixed element by operation of the first brake B1, and the fourth forward speed stage is achieved.

The first, third, and fourth clutches C1, C3, and C4 are simultaneously operated at a fifth forward speed stage D5. In a state that the third rotation shaft TM3 is connected to the seventh rotation shaft TM7 by operation of the first clutch C1, and the fifth rotation shaft TM5 is connected to the eighth rotation shaft TM8 by operation of the fourth clutch C4, the input is made into the second and sixth rotation shafts TM2 and TM6. The first, second, and third planetary gear sets PG1, PG2, and PG3 enter direct-coupling states, and the fifth forward speed stage is achieved.

The first and fourth clutches C1 and C4 and the first brake B1 are simultaneously operated at a sixth forward speed stage D6. In a state that the third rotation shaft TM3 is connected to the seventh rotation shaft TM7 by operation of the first clutch C1, and the fourth rotation shaft TM4 is connected to the eighth rotation shaft TM8 by operation of the fourth clutch C4, the input is made into the second and sixth rotation shafts TM2 and TM6. The fourth rotation shaft TM4 is operated as the fixed element by operation of the first brake B1, and the sixth forward speed stage is achieved.

The first and fourth clutches C1 and C4 and the second brake B2 are simultaneously operated at a seventh forward speed stage D7. In a state that the third rotation shaft TM3 is connected to the seventh rotation shaft TM7 by operation of the first clutch C1, and the fourth rotation shaft TM4 is connected to the eighth rotation shaft TM8 by operation of the fourth clutch C4, the input is made into the second and sixth rotation shafts TM2 and TM6. The seventh rotation shaft TM7 is operated as the fixed element by operation of the second brake 92, and the seventh forward speed stage is achieved.

The first clutch C1 and the first and the second brakes B1 and B2 are simultaneously operated at an eighth forward speed stage D8. In a state that the third rotation shaft TM3 is connected to the seventh rotation shaft TM7 by operation of the first clutch C1, and the input is made into the second and sixth rotation shafts TM2 and TM6. The fourth and seventh rotation shafts TM4 and TM7 are operated as the fixed elements by operation of the first and second brakes B1 and B2, and the eighth forward speed stage is achieved.

The second and fourth clutches C2 and C4 and the second brake B2 are simultaneously operated at a first reverse speed stage REV1. In a state that the first rotation shaft TM1 is connected to the seventh rotation shaft TM7 by operation of the second clutch C2, and the fourth rotation shaft TM4 is connected to the eighth rotation shaft TM8 by operation of the fourth clutch C4, the input is made into the second and sixth rotation shafts TM2 and TM6. The seventh rotation shaft TM7 is operated as the fixed elements by operation of the second brake B2, and the reverse speed stage is achieved.

The planetary gear train according to various embodiments of the present invention may achieve eight forward speed stages and one reverse speed stage by control of three planetary gear sets PG1, PG2, and PG3 with four clutches C1, C2, C3, and C4, and two brakes B1 and B2.

Since a speed stage suitable for an engine speed can be achieved due to multiple speed stages, silent driving may be improved.

Since engine driving efficiency can be achieved due to multiple speed stages, power delivery performance and fuel efficiency may be improved.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving torque of an engine;
    an output shaft outputting changed torque of the engine;
    a first planetary gear set including first, second, and third rotational elements;
    a second planetary gear set including fourth, fifth, and sixth rotational elements;
    a third planetary gear set including seventh, eighth, and ninth rotational elements;
    a first rotation shaft including the first rotational element and the sixth rotational element;
    a second rotation shaft including the second rotational element and directly connected to the input shaft;
    a third rotation shaft including the third rotational element;
    a fourth rotation shaft including the fourth rotational element and selectively connected to a transmission housing;
    a fifth rotation shaft including the fifth rotational element and directly connected to the output shaft;
    a sixth rotation shaft including the seventh rotational element and directly connected to the input shaft;
    a seventh rotation shaft including the eighth rotational element and selectively connected to the first rotation shaft and the third rotation shaft; and
    an eighth rotation shaft including the ninth rotational element and selectively connected to the fourth rotation shaft and the fifth rotation shaft.

2. The planetary gear train of claim 1, wherein:
    the first planetary gear set is a single-pinion planetary gear set, in which the first rotation element is a first sun gear, the second rotation element is a first planet carrier, and the third rotation element is a first ring gear;
    the second planetary gear set is a single-pinion planetary gear set, in which the fourth rotation element is a second sun gear, the fifth rotation element is a second planet carrier, and the sixth rotation element is a second ring gear; and
    the third planetary gear set is a single-pinion planetary gear set, in which the seventh rotation element is a third sun gear, the eighth rotation element is a third planet carrier, and the ninth rotation element is a third ring gear.

3. The planetary gear train of claim 1, further comprising:
    a first clutch selectively connecting the third and seventh rotation shafts;

a second clutch selectively connecting the first rotation shaft and the seventh rotation shaft;
a third clutch selectively connecting the fifth rotation shaft and the eighth rotation shaft;
a fourth clutch selectively connecting the fourth rotation shaft and the eighth rotation shaft;
a first brake selectively connecting the fourth rotation shaft and the transmission housing; and
a second brake selectively connecting the seventh rotation shaft and the transmission housing.

4. The planetary gear train of claim 3, wherein:
a first forward speed stage is achieved by operation of the second and fourth clutches and the first brake;
a second forward speed stage is achieved by operation of the second and third clutches and the first brake;
a third forward speed stage is achieved by operation of the first and second clutches and a first brake;
a fourth forward speed stage is achieved by operation of the first and third clutches and the first brake:
a fifth forward speed stage is achieved by operation of the first, third, and fourth clutches;
a sixth forward speed stage is achieved by operation of the first and fourth clutches and the first brake;
a seventh forward speed stage is achieved by operation of the first and fourth clutches and the second brake;
an eighth forward speed stage is achieved by operation of the first clutch and the first and second brakes; and
shifting to the reverse speed stage is achieved by operation of the second and fourth clutches and the second brake.

5. A planetary gear train of an automatic transmission for a vehicle, comprising:
an input shaft receiving torque of an engine;
an output shaft outputting changed torque of the engine;
a first planetary gear set including first, second, and third rotational elements;
a second planetary gear set including fourth, fifth, and sixth rotational elements;
a third planetary gear set including seventh, eighth, and ninth rotational elements;
a first rotation shaft including the first rotational element and sixth rotational element;
a second rotation shaft including the second rotational element and directly connected to the input shaft;
a third rotation shaft including the third rotational element;
a fourth rotation shaft including the fourth rotational element and selectively connected to a transmission housing;
a fifth rotation shaft including the fifth rotational element and directly connected to the output shaft;
a sixth rotation shaft including the seventh rotational element and directly connected to the input shaft;
a seventh rotation shaft including the eighth rotational element and selectively connected to the first rotation shaft and the third rotation shaft;
an eighth rotation shaft including the ninth rotational element and selectively connected to the fourth rotation shaft and the fifth rotation shaft;
a first clutch selectively connecting the third and seventh rotation shafts;
a second clutch selectively connecting the first rotation shaft and the seventh rotation shaft;
a third clutch selectively connecting the fifth rotation shaft and the eighth rotation shaft;
a fourth clutch selectively connecting the fourth rotation shaft and the eighth rotation shaft;
a first brake selectively connecting the fourth rotation shaft and the transmission housing; and
a second brake selectively connecting the seventh rotation shaft and the transmission housing.

6. The planetary gear train of claim 5, wherein:
the first planetary gear set is a single-pinion planetary gear set, in which the first rotation element is a first sun gear, the second rotation element is a first planet carrier, and the third rotation element is a first ring gear;
the second planetary gear set is a single-pinion planetary gear set, in which the fourth rotation element is a second sun gear, the fifth rotation element is a second planet carrier, and the sixth rotation element is a second ring gear; and
the third planetary gear set is a single-pinion planetary gear set, in which the seventh rotation element is a third sun gear, the eighth rotation element is a third planet carrier, and the ninth rotation element is a third ring gear.

7. The planetary gear train of claim 5, wherein:
a first forward speed stage is achieved by operation of the second and fourth clutches and the first brake;
a second forward speed stage is achieved by operation of the second and third clutches and the first brake;
a third forward speed stage is achieved by operation of the first and second clutches and a first brake;
a fourth forward speed stage is achieved by operation of the first and third clutches and the first brake;
a fifth forward speed stage is achieved by operation of the first, third, and fourth clutches;
a sixth forward speed stage is achieved by operation of the first and fourth clutches and the first brake;
a seventh forward speed stage is achieved by operation of the first and fourth clutches and the second brake;
an eighth forward speed stage is achieved by operation of the first clutch and the first and second brakes; and
shifting to the reverse speed stage is achieved by operation of the second and fourth clutches and the second brake.

8. A planetary gear train of an automatic transmission for a vehicle, comprising:
an input shaft receiving torque of an engine;
an output shaft outputting changed torque of the engine;
a first planetary gear set that is a single-pinion planetary gear set and includes a first sun gear, a first planet carrier, and a first ring gear;
a second planetary gear set that is a single-pinion planetary gear set and includes a second sun gear, a second planet carrier, and a second ring gear;
a third planetary gear set that is a single-pinion planetary gear set, and includes a third sun gear, a third planet carrier, and a third ring gear;
a first rotation shaft including, the first sun gear;
a second rotation shaft including the first planet carrier and directly connected to the input shaft;
a third rotation shaft including the first ring gear;
a fourth rotation shaft including the second sun gear and selectively connected to a transmission housing;
a fifth rotation shaft including the second planet carrier and directly connected to the output shaft;
a sixth rotation shaft including the third sun gear and directly connected to the input shaft;
a seventh rotation shaft including the third planet carrier and selectively connected to the first rotation shaft and the third rotation shaft; and an eighth rotation shaft including the third ring gear and selectively connected to the fourth rotation shaft and the fifth rotation shaft.

9. The planetary gear train of claim 8, further comprising:
a first clutch selectively connecting the third and seventh rotation shafts;
a second clutch selectively connecting the first rotation shaft and the seventh rotation shaft;
a third clutch selectively connecting the fifth rotation shaft and the eighth rotation shaft;
a fourth clutch selectively connecting the fourth rotation shaft and the eighth rotation shaft;
a first brake selectively connecting the fourth rotation shaft and the transmission housing; and
a second brake selectively connecting the seventh rotation shaft and the transmission housing.

10. The planetary gear train of claim 9, wherein:
a first forward speed stage is achieved by operation of the second and fourth clutches and the first brake;
a second forward speed stage is achieved by operation of the second and third clutches and the first brake;
a third forward speed stage is achieved by operation of the first and second clutches and a first brake;
a fourth forward speed stage is achieved by operation of the first and third clutches and the first brake;
a fifth forward speed stage is achieved by operation of the first, third, and fourth clutches;
a sixth forward speed stage is achieved by operation of the first and fourth clutches and the first brake;
a seventh forward speed stage is achieved by operation of the first and fourth clutches and the second brake;
an eighth forward speed stage is achieved by operation of the first clutch and the first and second brakes; and
shifting to the reverse speed stage is achieved by operation of the second and fourth clutches and the second brake.

* * * * *